Figure 1:
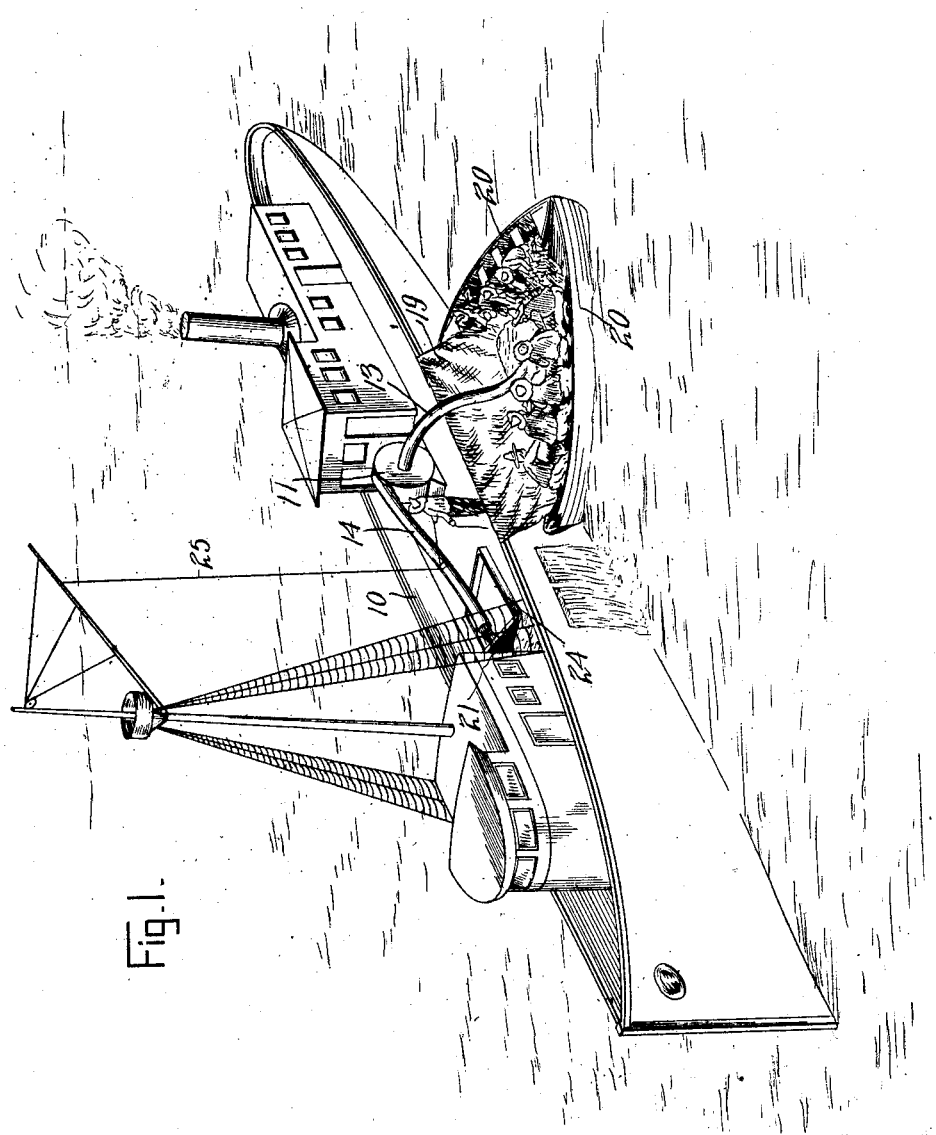

W. J. DAVIS.
METHOD AND MEANS FOR CATCHING FISH.
APPLICATION FILED SEPT. 9, 1919.

1,361,691.

Patented Dec. 7, 1920.
3 SHEETS—SHEET 1.

Inventor
William J. Davis

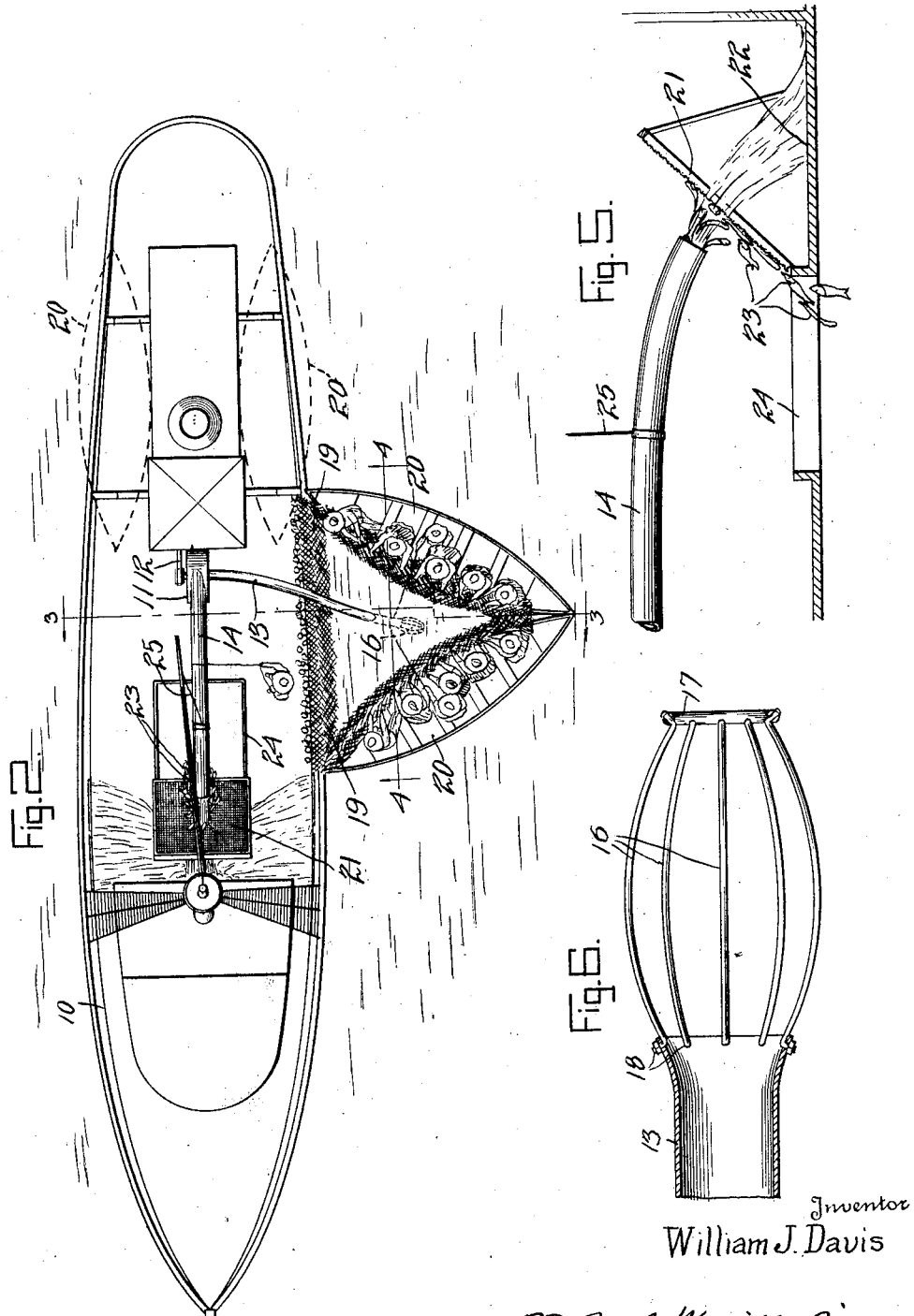

W. J. DAVIS.
METHOD AND MEANS FOR CATCHING FISH.
APPLICATION FILED SEPT. 9, 1919.
1,361,691.
Patented Dec. 7, 1920.
3 SHEETS—SHEET 3.
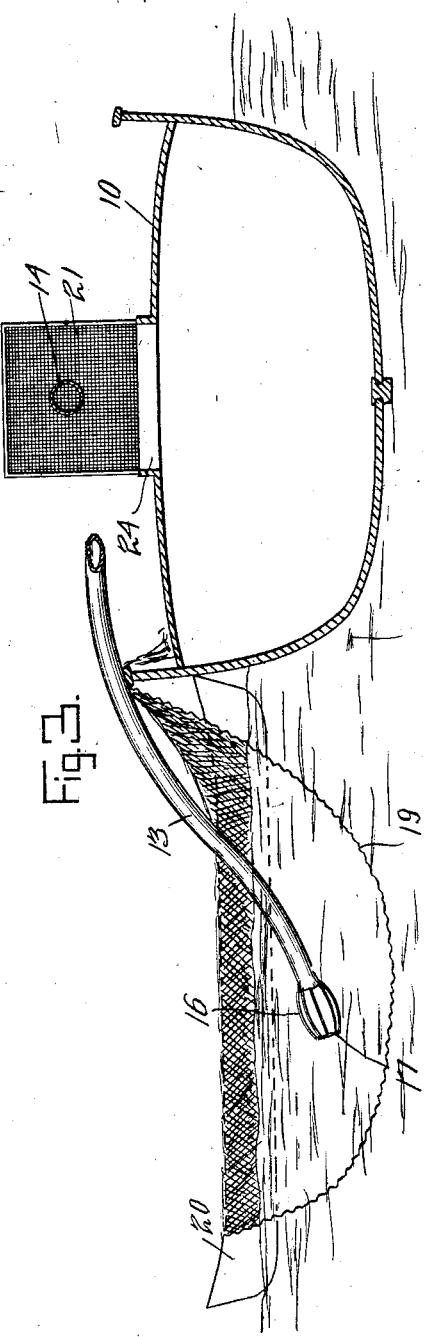
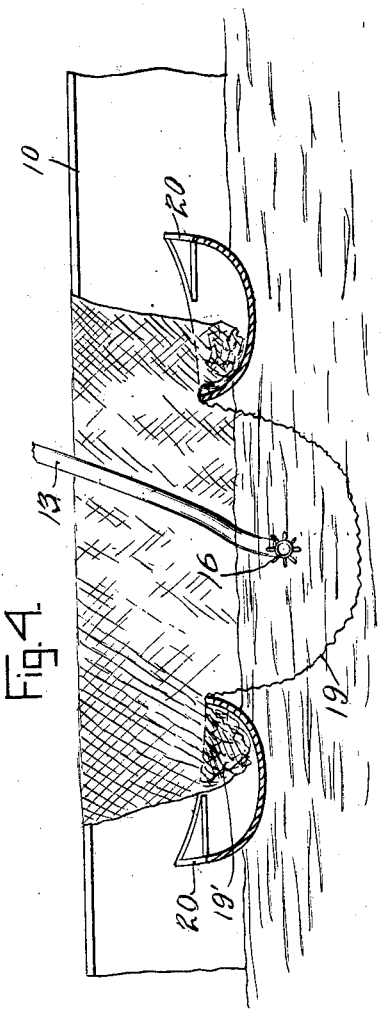
Inventor
William J. Davis.
By Bradford Morrill & Bimran
Attorneys

UNITED STATES PATENT OFFICE.

WILLIAM J. DAVIS, OF FERNANDINA, FLORIDA, ASSIGNOR OF ONE-THIRD TO LOUIS G. HIRTH, OF FERNANDINA, FLORIDA.

METHOD AND MEANS FOR CATCHING FISH.

1,361,691.  Specification of Letters Patent.  Patented Dec. 7, 1920.

Application filed September 9, 1919. Serial No. 322,680.

*To all whom it may concern:*

Be it known that I, WILLIAM J. DAVIS, a citizen of the United States, residing at Fernandina, in the county of Nassau and State of Florida, have invented certain new and useful Improvements in Methods and Means for Catching Fish, of which the following is a specification.

This invention relates to a method of catching fish and to an apparatus for practising the method and has for an object to provide a method and apparatus for taking fish in large quantities from deep waters.

A further object of the invention is to provide means and methods for taking from a "purse" net great quantities of fish and discharging them into the hold of a vessel, or the like, without the necessity of employing dip nets, as is the present custom.

A further object of the invention is to provide a vessel with a pump adapted to pump up the fish and water within which the fish are immersed, having been brought to the intake of the pump in a net and discharge the fish into a receptacle and the water over the side of the vessel.

Referring to the accompanying drawings which form a part hereof, and on which similar reference characters indicate similar parts, Figure 1 is a perspective view of a vessel with the boats controlling the nets in operative relation to the vessel and the pump in operative position, Fig. 2, a top plan view of a vessel and boats embracing the purse net and showing the relation of the parts in the practice of the present invention, Fig. 3, a transverse sectional view through the vessel and net showing one of the boats in side elevation taken on line 3—3 of Fig. 2, Fig. 4, a sectional view taken through the two boats showing the relation of the net, the boats and the intake, and showing parts of the vessel in side elevation, Fig. 5, a diagrammatic view showing the manner of discharging the fish and water upon a screen whereby the water is discharged over the side of the vessel and the fish through the hatchway, and Fig. 6 is a detail sectional view of the intake nozzle.

In the practice of fishing in deep waters for large quantities of fish, as practised at the present time, a vessel is employed with a net of great area, parts of which are carried by small boats, which after embracing the fish in the usual manner, are brought to the side of the vessel and the excess net taken into the boats, compacting the fish into a fish mass adjacent the side of the vessel. The fish are then loaded into the vessel by the use of power-hoisted dip nets which are manually inserted into the "purse" net between the boats and after being filled is hoisted to the deck of the vessel for discharging the contents into the hold or other receptacle. In cases where the catch is of unexpected or unusual volume, it has been found impossible to raise the catch sufficiently near the surface of the water so that the dip net may be employed and very great catches of fish have been lost rather than break the net in an endeavor to raise the fish the required distance from the surface. The present invention involves the method and apparatus of inserting into the water within the net area the intake of a pump, handling large volumes of water which will lift the fish contained within the net through the pump and discharge them onto a separator, separating the fish from the water. The present invention embraces the use of a pump of any approved type mounted, of course, upon any appropriate vessel or other float whereby the fish contained within the net which have been brought to convenient relation with the intake, may be conveyed from the confines of the net to the prepared receptacle.

As specifically shown in the drawings a vessel 10 of substantially the usual, or any appropriate, type is employed, upon which is mounted a pump 11 of any approved type and volume driven from any approved source, as by the use of the belt 12. The pump is provided with a flexible intake pipe 13 and a discharge pipe 14 in substantially the usual and ordinary manner. The intake pipe 13, for the purpose of insuring the maximum results in operation, is preferably provided at its end with a bell 15 and a cage comprising a plurality of curved bars 16. The cage may be constructed in any approved manner but preferably by uniting one end of each of the curved bars to a central part 17 and inserting the opposite ends bent substantially at right-angles through the edge of the bell 15, as indicated at 18. The members of the cage are spaced a sufficient distance apart to offer substantially no obstruction to the passage of fish of ordinary sizes but to prevent the admission of fish large enough to choke up the intake pipe 13, and also prevent sections of the net from entering the intake pipe. Said cage is preferably rounded and with a minimum number of sharp corners to prevent tearing the net when it is brought into engagement therewith in the course of operation.

The net 19 is brought to the vessel 10 by the employing boats 20 in substantially the usual manner, the excess being taken into the boats as indicated at 19' at Fig. 4. The operation of the net embracing the catch is therefore defined by the opening between the boats 20 and the vessel 10 as shown particularly at Figs. 1 and 2. The intake pipe 13 is lowered into the net in this position as shown at Figs. 1, 2, 3 and 4, when, the pump being started, fish contained in the water embraced within the net are drawn within the intake pipe 13 and pump 11 and discharged through the discharge pipe 14. For the purpose of separating the fish from the water the discharge pipe 14 preferably discharges upon a screen 21, the water passing through the screen upon the deck 22 or other means for conducting the water over the sides of the vessel, while the fish, indicated at 23 in Fig. 5, are discharged through the hatchway 24 into the hold of the vessel. The operation of the pump 11 when approaching its maximum capacity will produce sufficient force upon the screen 21 to prevent the fish indicated at 23 from falling therefrom. For this purpose it is desirable that the screen 21 be made of such size that the intake pipe may move laterally relative thereto so that the fish may be dropped readily therefrom into the hatchway. For this purpose the discharge pipe 14 is preferably suspended as indicated at 25 and so suspended may be manually moved laterally for the purpose indicated.

By this means the fish may be transferred from the net to the vessel very rapidly, the apparatus made operative for all conditions of net and quantities of fish, and the difficulties experienced by the methods and apparatus heretofore employed overcome.

Having thus fully described my said invention, what I claim as new and desire to secure by Letters Patent, is:

1. An apparatus for fishing comprising in combination with a vessel having a hold and a hatch-way providing access to the hold, of a screen mounted upon the deck of the vessel adjacent the hatchway and at an angle to the deck, a pump carried by the vessel having a discharge pipe spaced from the screen and directed to discharge water with contained fish against the upper side of the screen whereby the water freely passes through the screen and the fish are guided by the screen to the hold, an intake pipe connected with the pump and overhanging the side of the vessel, and a net containing fish supported adjacent the vessel.

2. An apparatus for fishing comprising in combination with a vessel having a hold and a hatchway providing access to the hold, of a pump carried by and driven from the vessel, a screen for separating fish from water causing the fish to be directed through the hatchway and allowing the water to be returned to the surrounding medium, a discharge pipe for the pump positioned to discharge upon the screen said discharge pipe being of a flexible nature to permit its being swung back and forth over the screen and an intake pipe communicating with previously caught fish.

3. An apparatus for fishing comprising in combination with a vessel having a hold and a hatchway providing access to the hold, of a pump carried by and driven from the vessel, a screen for separating fish from water causing the fish to be directed through the hatchway and allowing the water to be returned to the surrounding medium, a discharge pipe for the pump positioned to discharge upon the screen said discharge pipe being of a flexible nature to permit its being swung back and forth over the screen, an intake pipe communicating with previously caught fish, and a cage, for the end of the pipe substantially as described and for the purpose set forth.

4. An apparatus for fishing comprising a vessel provided with a hold and a hatchway communicating therewith, of a pump mounted upon and driven from the vessel, separating means adjacent the hatchway and extending freely above the deck said separating means permitting water to be returned to the surrounding medium but causing fish to be separated therefrom and to be guided by the separating means into the hold, an outlet pipe communicating with the pump and discharging to said separating means, and an inlet pipe communicating with the pump and the source of supply of water and contained fish.

5. An apparatus for fishing comprising in combination with a vessel having a hold and a hatchway providing access thereto, of a pump, a net adjacent the vessel to confine fish, an inlet pipe connecting the pump with the net, a discharge pipe communicating with the pump and adapted to overhang the hatchway, a separating screen adjacent the hatchway and means to support the discharge pipe adjacent the screen and in the said overhanging position.

6. An apparatus for fishing comprising in combination with a vessel having a hold and a hatchway providing access thereto, of a pump, a net adjacent the vessel to confine fish, an inlet pipe connecting the pump with the net, a discharge pipe communicating with the pump and adapted to overhang the hatchway, a separating screen adjacent the hatchway and means to support the discharge pipe adjacent the screen and in the said overhanging position from the rigging of the vessel.

7. An apparatus for fishing comprising in combination with a vessel having a hold and a hatchway providing access thereto, of a pump, a net adjacent the vessel to confine fish, an inlet pipe connecting the pump with the net, a discharge pipe communicating with the pump and adapted to overhang the hatchway, a separating screen adjacent the hatchway and means to support the discharge pipe adjacent the screen and in the said overhanging position from the rigging of the vessel said supporting means permitting the discharge pipe to be moved back and forth adjacent the screen.

In witness whereof, I have hereunto set my hand and seal at Washington, District of Columbia, this 6th day of August, A. D. nineteen hundred and nineteen.

WILLIAM J. DAVIS. [L. S.]

Witnesses:
E. W. BRADFORD,
L. L. MORRILL.